March 15, 1960 L. D. KAY 2,928,510
BRAKE SHOE CONSTRUCTION
Filed June 19, 1956 2 Sheets-Sheet 1
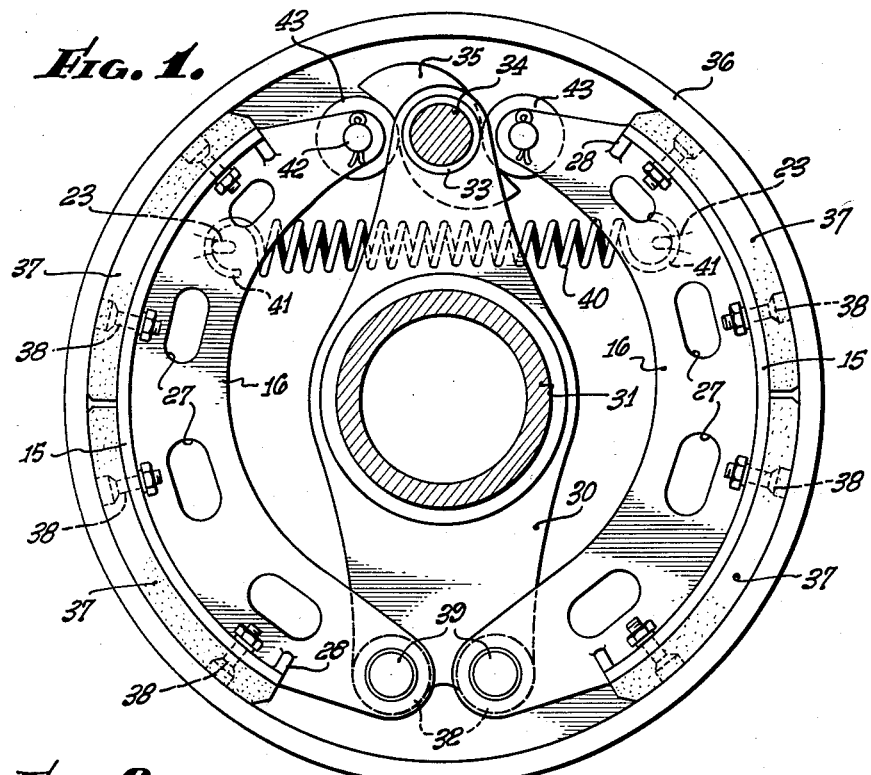
FIG. 1.
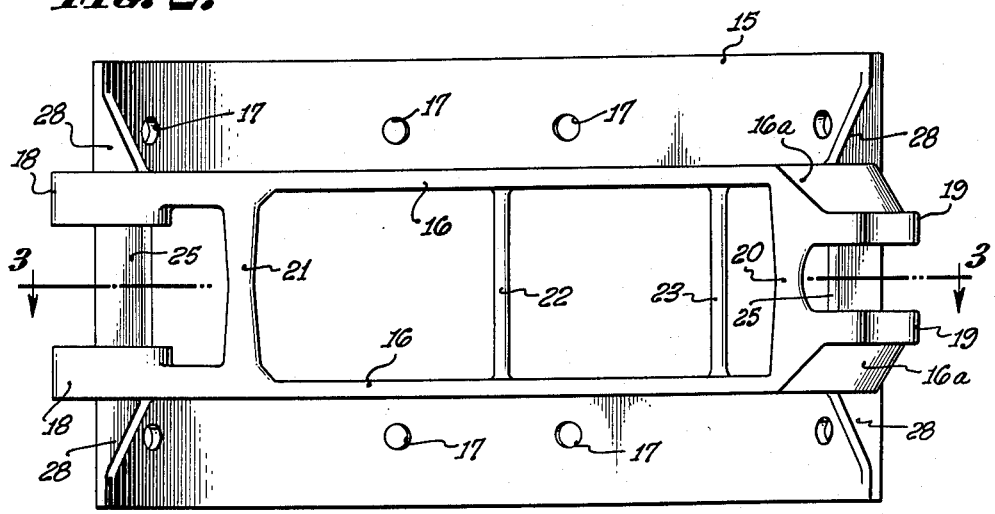
FIG. 2.
INVENTOR.
LLOYD D. KAY,
BY
ATTORNEY.

March 15, 1960 L. D. KAY 2,928,510
BRAKE SHOE CONSTRUCTION
Filed June 19, 1956 2 Sheets-Sheet 2
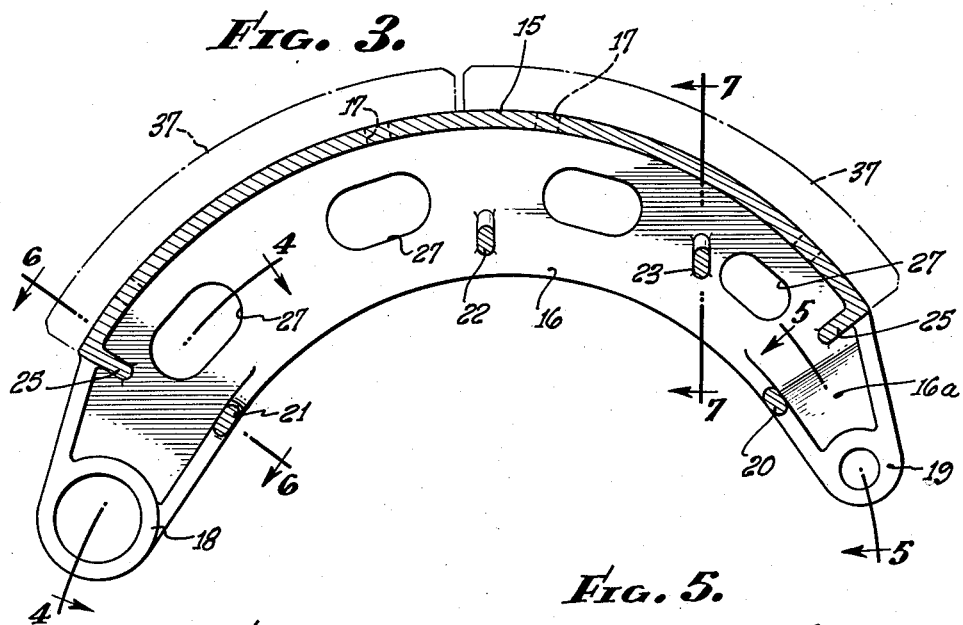
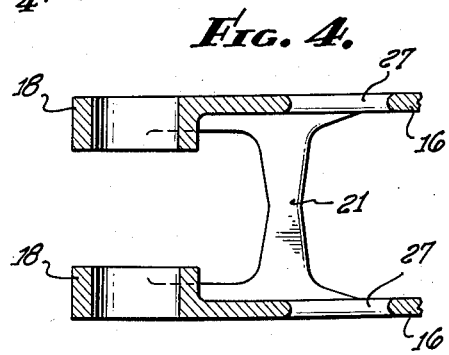
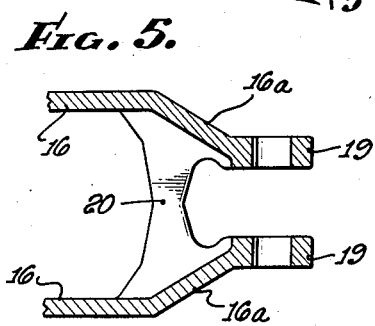
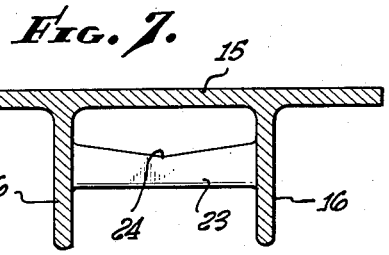
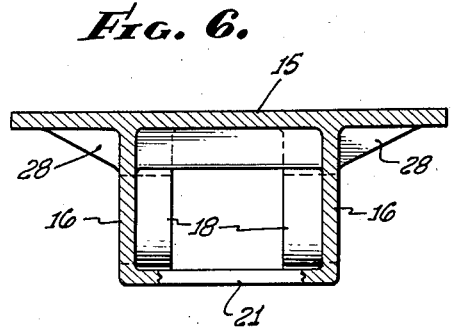
INVENTOR.
LLOYD D. KAY,
BY
ATTORNEY.

United States Patent Office 2,928,510
Patented Mar. 15, 1960

2,928,510

BRAKE SHOE CONSTRUCTION

Lloyd D. Kay, San Marino, Calif., assignor to Kay-Brunner Steel Products, Inc., a corporation of Delaware Application June 19, 1956, Serial No. 592,348

1 Claim. (Cl. 188—250)

My invention relates to brake shoe constructions as used on internal expanding brakes for heavy duty trucks and trailers.

In such brake constructions as heretofore proposed their structures are such that due to the rough usage to which they are subjected in controlling movements of heavy duty vehicles, they become distorted by reason of the heat generated in its parts. and the intense pressures necessary to effective brake applications. This naturally results in shortening the useful life of the brakes. Numerous efforts have been made to design a brake shoe construction which will eliminate these defects, and in a few instances success has been achieved but only by greatly increasing the weight of the structure and, of course, the amount of metal employed.

It is a purpose of my invention to provide a brake shoe construction which successfully overcomes the above-recited defects and yet decreases the weight thereof, and hence uses less metal.

A further purpose of my invention is to provide a brake shoe construction which embodies a shoe member to which the brake block or liner is secured, and a mounting structure for the shoe member that functions to effectively support the member against distortion as a result of brake pressures, as well as distortion of the structure itself because of heat and/or pressure.

Another purpose of my invention is to provide a shoe mounting structure that affords connection of the usual spring for contracting the shoe, at a centered point longitudinally of the structure to eliminate twisting or cocking of the structure, and more particularly the shoe, so that the latter when in expanded position will cause the liner to be uniformly pressed against the brake drum to secure maximum braking action.

I will describe only one form of brake shoe construction embodying my invention, as embodied in one form of brake, and will then point out the novel features thereof in the claim.

In the accompanying drawings:

Fig. 1 is a view showing in side elevation a vehicle brake, with the drum supporting axle and cam shaft in section, and in which is incorporated two brake shoe constructions each constructed in accordance with my invention.

Fig. 2 is a detail plan view of the brake shoe construction of my invention.

Fig. 3 is a horizontal sectional view taken on the line 3—3 of Fig. 2.

Fig. 4 is a sectional view taken on the line 4—4 of Fig. 3.

Fig. 5 is a sectional view taken on the line 5—5 of Fig. 3.

Fig. 6 is a sectional view taken on the line 6—6 of Fig. 3.

Fig. 7 is a sectional view taken on the line 7—7 of Fig. 3.

Referring more particularly to the drawings, my brake shoe construction, in its present form, comprises a metallic shoe member 15 which is of rectangular plate design, and curved longitudinally on a radius corresponding to that of the brake drum with which it is adapted to be associated.

Cast integral with, or formed separately from and then welded to the shoe member 15 is a metallic mounting or supporting structure for the shoe member that may be cast with or without the member as a single unit and which, in the present instance, comprises two arcuate elements in the form of relatively thin elongated plates curved longitudinally on a radius corresponding to that of the concave side of the shoe member 15, and as secured thereto along their convex edges constitute a pair of flanges indicated at 16. These flanges as so fixed to the concave side of the shoe member 15 are to be arranged in spaced parallelism one to the other thereon, and this spacing is such that they are disposed adjacent the longitudinal edges of the shoe member just inside the screw holes 17 in the shoe member.

The flanges 16, in length, exceed that of the shoe member 15, and where they extend beyond the latter at one end, they are formed with registering bearing ears 18 which are flush with the outer sides of the flanges but project from the inner sides to provide the necessary width thereto to adequately serve the purpose for which they are intended. At the opposite end of the flanges, where they extend beyond the other end of the shoe member, they are bent inwardly in converging relation to each other, as indicated at 16a, where their free ends are formed with registering bearing ears 19. These converging flange portions 16a are rigidly braced by a substantially U-shaped web 20.

Those end portions of the flanges 16 adjacent the bearing ears 18 are rigidly braced tranversely at their concave edges by a substantially U-shaped web 21. Between the webs 20 and 21 the flanges 16 are additionally braced by stays 22 and 23 and, as shown in Fig. 7, the stay 23 is of V-form along one edge thereof to provide a recess 24 medially of its ends in which one end of a spring is adapted to engage, as will be more fully described hereinafter. At the ends of the shoe member 15 the flanges are additionally braced by transverse stays 25 and 26.

For the purpose of permitting free circulation of air through the flanges 16 to dissipate heat resultant of brake applications, and to thereby maintain the whole shoe construction relatively cool, the flanges are formed with openings 27 at spaced intervals along the length thereof, and at points between the stays 22, 23, 25 and 26. Of course, the openings in one flange register with those in the other.

While the afore-described stays and webs rigidly and effectively brace the flanges 16 against distortion or detachment from the shoe member 15 under stresses imposed against the outer sides thereof, they are also braced against stresses imposed outwardly from their inner sides by means of gussets 28, which, as best shown in Figs. 2 and 4, bridge the corners between the outer sides of the flanges and the concave side of the shoe member.

In Fig. 1 is shown a vehicle brake in which two brake shoe constructions, each made in accordance with my invention, are incorporated. This brake otherwise is of conventional form, and includes an anchor member 30 fixed to a tubular axle 31 and provided at its lower end with a pair of bearing hubs 32. At its upper end the anchor member is formed with a bearing hub 33 in which a shaft 34 is journalled and provided with a double cam 35. A brake drum 36 surrounds the axle 31 and the anchor member 30 and, of course, is adapted to be fixed to a wheel rotatable on the axle.

Each brake shoe construction is, of course, provided with a liner 37 secured to the outer periphery of the shoe member 15 by screws 38 which extend through the openings 17. Each brake shoe construction is pivotally mounted at its lower end by an anchor pin 39 which extends through the bearing ears 18 and one of the bearing hubs 32. The two shoe constructions are urged to contracted position within the drum by means of a coil spring 40, the hooked ends 41 of which are extended about the stays 23 at points within the notches 24.

In the ears 19 of each shoe construction is mounted a pin 42 upon which is fixed a roller 43, and the rollers of the two constructions bear against reverse sides of the cam 35 so that by turning the cam the two brake shoes will be moved outwardly against the tension of the spring 40 to bring the liners 37 into braking contact with the drum 36.

In the use of my brake shoe construction in a brake, the supporting structure for the shoe member 15 functions to so firmly support the shoe member as to eliminate any tendency of it becoming distorted under heat or pressure, and particularly at the longitudinal marginal edges thereof, since the flanges 16 serve to rigidly support the shoe member along longitudinal lines spaced one from the other at opposite sides of its center. The flanges, in turn, are firmly anchored to the shoe member and rigidly supported in spaced relation one to the other thereon by the stays, webs, and gussets, and in planes perpendicular to the shoe member. As a result, this support is so effective as to successfully resist all transverse strains and stresses imposed in either direction on the flanges arising from use of the brake. At the same time the supporting structure is relatively light in weight as compared to prior constructions, and therefore requires less metal to construct, the use of a lighter spring, and renders the brake more easily operated.

Another advantage resultant of my shoe construction is that the spring 40 in being connected at the center of the stay 23 exerts a pull along the major axis of the shoe construction, thus eliminating any tendency of the shoe twisting or cocking and failing to completely and uniformly contact with the drum when expanded thereagainst, and not producing maximum braking action.

Although I have herein shown and described only one form of brake shoe construction embodying my invention, it is to be understood that various changes and modifications may be made therein without departing from the spirit of the invention and the spirit and scope of the appended claim.

What I claim is:

A brake shoe of unitary-cast construction including: a shoe member of arcuate plate form; a supporting structure for said member comprising a pair of arcuate flanges secured at one of their longitudinal edges to and in perpendicular relation on the concave side of said member in spaced parallelism to each other thereon and exceeding the same in length so as to project from opposite ends of the shoe member, those ends of said flanges which project from one end of the shoe member inclined toward each other and terminating in parallel-spaced bearing ears, and those ends of said flanges which project from the other end of the shoe member being in spaced parallelism and terminating in bearing ears; a web between and connecting said inclined flange ends; a second web between and rigidly connecting the last-mentioned projecting ends of said flanges; gussets of triangular form disposed laterally of the outer sides of said flanges at the ends thereof and fixed to the latter and to the shoe member; and stays between and rigidly connecting said flanges at spaced intervals along the length thereof, said stays being connected with flanges at points spaced a substantial distance inwardly from the longitudinal edges and intermediate the edges such that the stays extend from intermediate portions of the sides of the flanges to prevent bending deformation of the brake shoe, that stay at one end of the flanges provided medially of its ends with a notch adapted to be engaged by one end of a spring for urging the shoe member along its major axis to a contracted position as the shoe member is mounted in a drum, each of said flanges having a plurality of openings formed therein, said openings being disposed substantially medially between the opposite longitudinal edges of the respective flanges, and the stays being connected to said flanges at points between adjacent ones of said openings, the openings providing for free circulation about the brake shoe to assist in cooling thereof.

References Cited in the file of this patent

UNITED STATES PATENTS

| | | |
|---|---|---|
| 870,666 | Cookingham | Nov. 12, 1907 |
| 1,719,211 | Burton | July 2, 1929 |
| 2,568,777 | Super | Sept. 25, 1951 |

FOREIGN PATENTS

| | | |
|---|---|---|
| 542,112 | Great Britain | Dec. 24, 1941 |
| 746,304 | Great Britain | Mar. 14, 1956 |